United States Patent [19]

Kikuchi

[11] Patent Number: 5,604,322

[45] Date of Patent: Feb. 18, 1997

[54] AUTOMATIC PERFORMANCE APPARATUS WITH A DISPLAY DEVICE

[75] Inventor: Takeshi Kikuchi, Hamamatsu, Japan

[73] Assignee: Yamaha Corporation, Hamamatsu, Japan

[21] Appl. No.: 413,355

[22] Filed: Mar. 30, 1995

[30] Foreign Application Priority Data

Mar. 30, 1994 [JP] Japan .................... 6-085677

[51] Int. Cl.$^6$ .................................................. G09B 15/02
[52] U.S. Cl. ........................................... 84/477 R; 84/463
[58] Field of Search ........................... 84/609, 645, 649, 84/462, 463, 477 R

[56] References Cited

U.S. PATENT DOCUMENTS

| | | | |
|---|---|---|---|
| 5,085,116 | 2/1992 | Nakata et al. ........................... | 84/609 |
| 5,229,533 | 7/1993 | Sakurai ................................... | 84/618 |
| 5,270,477 | 12/1993 | Kawashima ............................. | 84/622 |
| 5,400,687 | 3/1995 | Ishii ........................................ | 84/477 R |
| 5,453,568 | 9/1995 | Tajima et al. ........................... | 84/609 |

*Primary Examiner*—Patrick J. Stanzione
*Attorney, Agent, or Firm*—Loeb & Loeb LLP

[57] ABSTRACT

An automatic performance apparatus with an improved non-performance state display device. The automatic performance apparatus includes a memory device for storing automatic performance data for a plurality of parts, a performing device for reading out the automatic performance data for a plurality of part and performing a plurality of parts, and a display device for displaying a score of a plurality of parts based on the automatic performance data read out. It also includes a designating device for designating a part in the score being displayed on the display means, a performance controlling device responsive to the designating device for controlling the performing device to set the part designated in a non-performance state, and a display controlling device responsive to designation of the designating device for controlling the display device to display that the designated part is in the non-performance state.

15 Claims, 6 Drawing Sheets

AUTOMATIC PERFORMANCE APPARATUS WITH A DISPLAY DEVICE

BACKGROUND OF THE INVENTION

1. Field of the Invention

The present invention relates to an automatic performing apparatus of an electronic musical instrument that is capable of automatically performing a plurality of parts, and in particular embodiments to an automatic performing apparatus that is capable of bringing desired parts in the automatic performance into a non-performing state.

2. Description of Related Art

There has been an automatic performing apparatus that simultaneously performs a plurality of parts, and is capable of muting some of the parts. Typically, such a performing apparatus is equipped with switches each for designating a performing state or a non-performing state of each of the parts. The switches are manipulated to bring designated parts into the non-performing state or into the performing state. Also, the automatic performance apparatus may have display elements such as LEDs provided for the corresponding switches. Each of the LEDs indicates either an ON or an OFF state for each of the switches to thereby indicate either the performing state or the non-performing state of each of the parts. However, although the performing state or the non-performing state of each part can be recognized by the ON or OFF state Of each of the switches, the performance content of each of the parts is not provided by the ON or OFF state of the switch.

SUMMARY OF THE INVENTION

It is an object of embodiments of the present invention to provide an automatic performance apparatus which is capable of simultaneously performing a plurality of parts and also capable of indicating the performance content of the parts, regardless of whether they are in the performance state or the non-performance state.

It is another object of embodiments of the present invention to provide an automatic performance apparatus having a memory device for storing automatic performance data for a plurality of parts, a performing device for reading out the automatic performance data for a plurality of parts and performing a plurality of parts, and a display device for displaying a score of a plurality of parts based on the read out automatic performance data. The automatic performance apparatus also includes a designating device for designating a part in the score being displayed on the display device, a performance controlling device, responsive to the designating device, for controlling the performing device to bring the part designated into a non-performance state, and a display controlling device, responsive to the designating device, for controlling the display device to display the non-performance state of the designated part.

In accordance with the above-mentioned configuration, performance data for a plurality of parts is retrieved for the automatic performance of the plurality of parts, and a musical score representing the plurality of parts is displayed on a display device. Furthermore, a particular part in the musical score may be selected on the display device to bring the particular part into a non-performance state. In accordance with embodiments of the present invention, not only the non-performance state of the particular part is indicated on the display device, but the content of the particular part in the non-performance state may be indicated on the display device.

Other features and advantages of the invention will be apparent from the following detailed description, taken in conjunction with the accompanying drawings which illustrate, by way of example, various features of embodiments of the invention.

DETAILED DESCRIPTION OF EMBODIMENT

Figure 1:
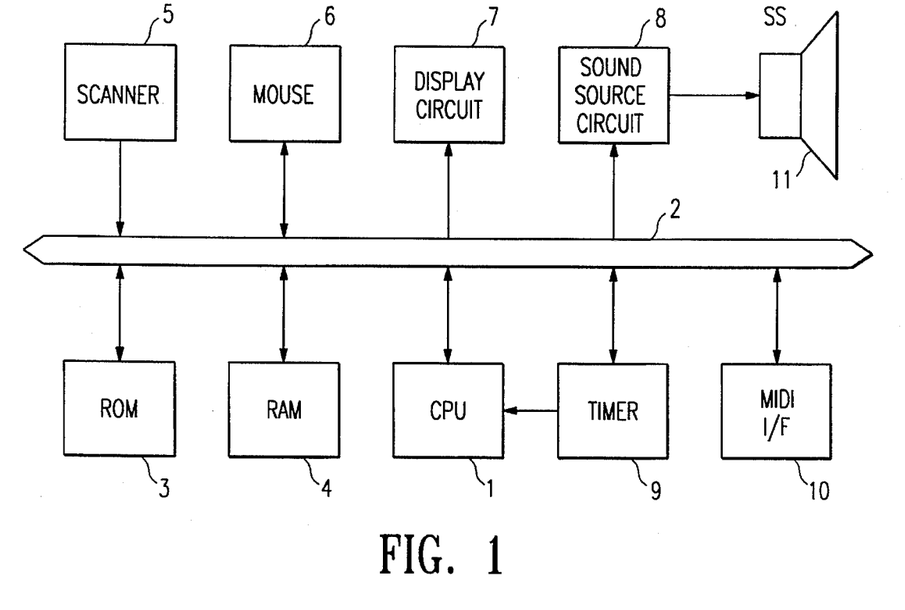
FIG. 1 is a schematic block diagram of a hardware configuration in accordance with an embodiment of the present invention.

An embodiment of the present invention is described below with reference to the accompanying drawings. FIG. 1 is a schematic block diagram of a hard ware configuration. A CPU 1 controls the overall operation of the apparatus, and executes processes in accordance with a control program stored in a ROM 3. The CPU 1 and respective elements are connected to each other through a bus 2 for transmission and reception of various data. A RAM 4 is provided with work areas, such as registers and flags, for temporarily storing various data generated during the processes executed by the CPU 1. The RAM 4 is also provided with work areas for storing image data of a score read by a scanner 5 (which will be described later) and automatic performance data. In one embodiment, the automatic performance data may be generated by image-processing the score image data read by the scanner 5 and by recognizing the content of the score. A timer 9 provides an interrupt signal to the CPU 1 at a variable cycle corresponding to a specific tempo. For example, at a cycle at which 96 signals are generated per a quarter note, or in other words, at a cycle equal to a three hundred eighty fourth note. The CPU 1, in response to the generation of the interrupt signal, reads out automatic performance data stored in the RAM 4 to carry out the automatic performance at a particular tempo.

The CPU 1 generates note data, such as, note-on, note-off or the like, based on the retrieved automatic performance data, and provides the note data through the bus 2 to a sound source circuit 8. The sound source circuit 8 generates a musical note waveshape signal according to the inputted note data and a musical note control data. The apparatus may use a sound source system, such as, a well-known waveshape memory read out system, an FM (frequency modulation) system, a physical model simulation system or the like. The musical note waveshape signal formed at the sound source circuit 8 is provided to a sound system 11 where a musical sound is generated.

The scanner 5 reads a score from a printed score or the like, and produces a score image data. The score image data is stored in a score image memory region provided in the RAM 4. Automatic performance data is generated by the score recognition process based on the stored score image data. The score recognition process utilizes well known techniques. Therefore, only a brief description of the score recognition process is provided, and its detailed description is omitted. Five lines are extracted from the obtained score image data and the location of the five lines and other features are detected. Then, the five lines are erased from the score image data. Various notes and signs are then extracted from the remaining score image during the recognition of the notes and the signs. Note pitches of the recognized notes are determined based on the location of the previously detected five lines. Automatic performance data is generated based on the determined note pitches and types of the recognized notes. In addition, a variety of other signs (G clef, F clef, meter, accidental marks such as sharp and flat) are considered to complete the generation of the automatic performance data.

The reference numeral 7 denotes a display device, such as an LCD for displaying the score image read by the scanner 5 and the automatic performance data obtained by the note recognition process. The display device 7 is also adapted for displaying a menu and switches for executing various functions of the automatic performance apparatus. The reference numeral 6 denotes a position indicating device, such as a mouse, track ball or the like for indicating and selecting particular menu items and switches to execute a variety of functions. The movement and the click operation of the mouse 6 are detected by the CPU 1.

The reference numeral 10 denotes a MIDI interface (I/F), for transmission and reception of MIDI data with an external electronic musical instrument. The MIDI interface 10 provides the note event data and other data generated by the automatic performance process to an external sound source apparatus.

Figure 2:
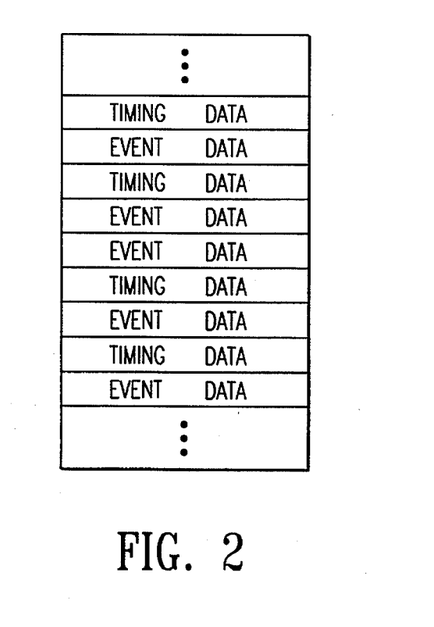
FIG. 2 shows a memory format of automatic performance data in accordance with an embodiment of the present invention.

FIG. 2 shows a memory format of automatic performance data generated in the manner described above. The automatic performance data includes event data representing various kinds of note events to be generated (e.g., key on/off, pitch and dynamics) and timing data representing timing of the event data generation. The timing data represents the number of clocks to be generated for a separation between two adjacent event data, each clock having a unit time length corresponding to the timer interrupt cycle as described above. The automatic performance data also includes data regarding bar lines, and data concerning loudness and pitch bend. When the inputted score consists of a plurality of performance parts, the automatic performance data in this memory format are stored in a number of locations corresponding to the number of the performance parts. In the automatic performance, timing data and event data of the automatic performance data for each of the plurality of the parts are read out in parallel with each other to carry out the automatic performance of the plurality of the parts. The memory format of the automatic performance data shown is one example. However, in alternative embodiments, other formats may be used to store the automatic performance data.

Figure 3:
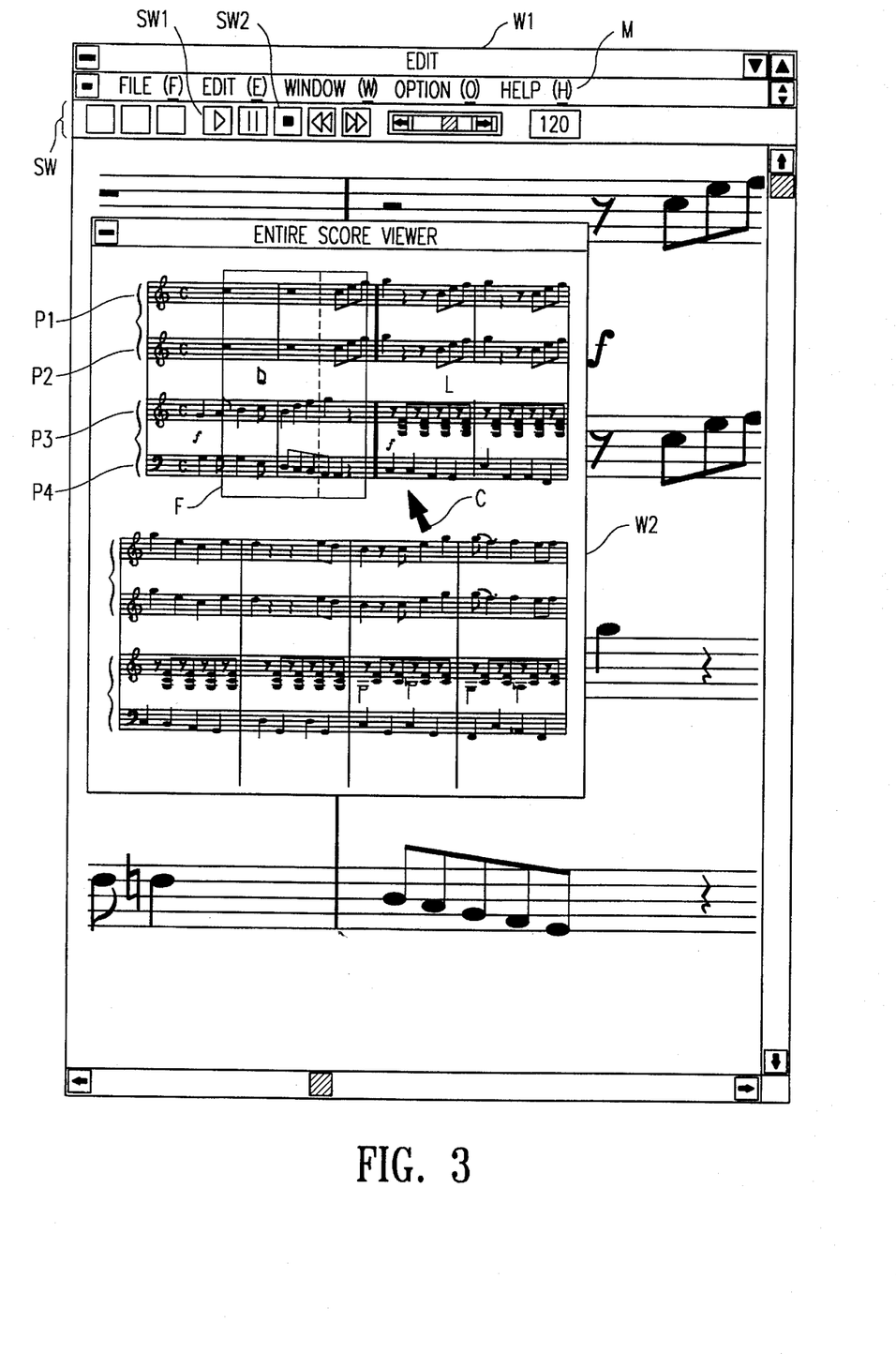
FIG. 3 shows a score in the performance state displayed on a display device in accordance with an embodiment of the present invention.
Figure 4:
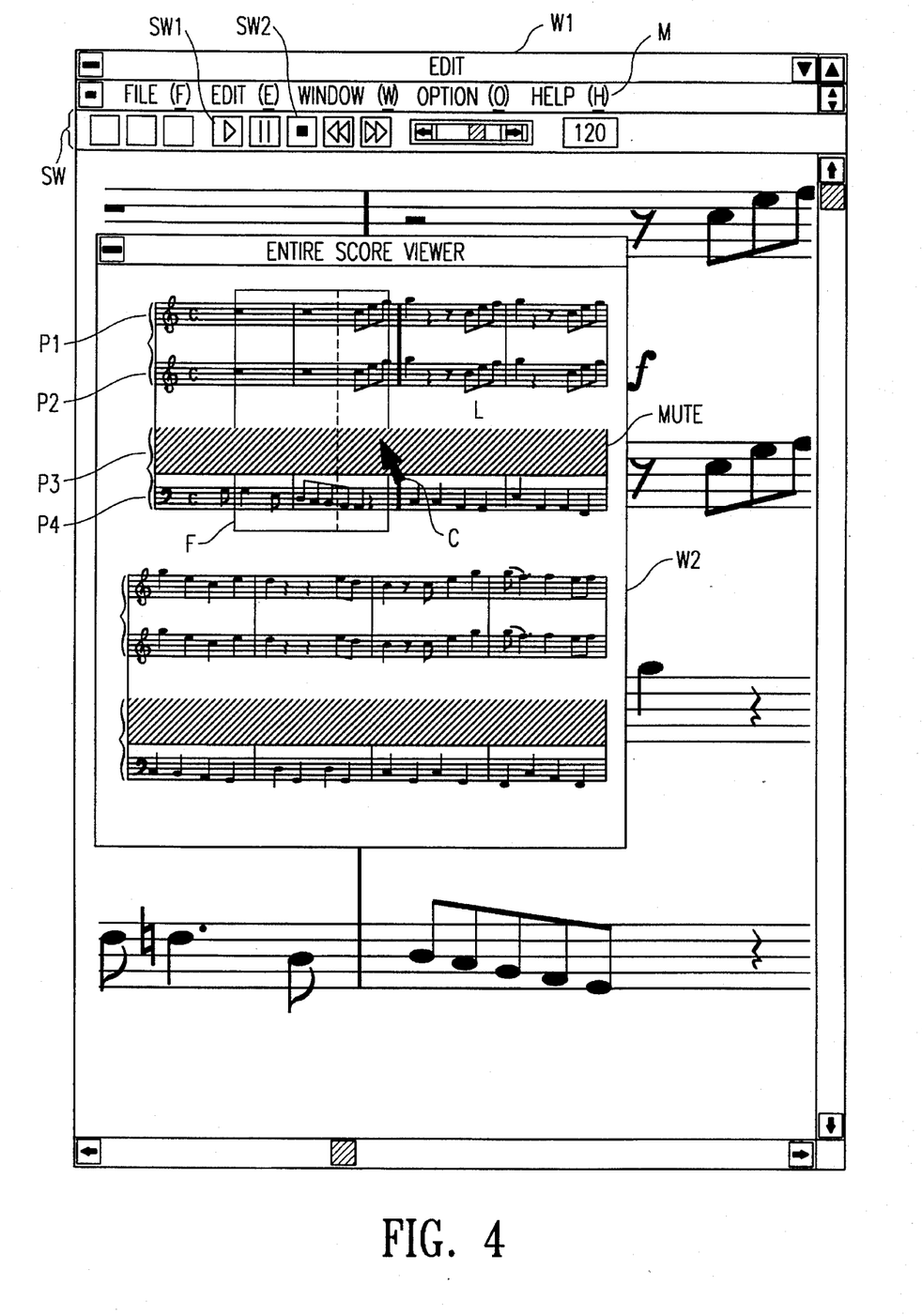
FIG. 4 shows a score with one part in the non-performance state in accordance with an embodiment of the present invention.

FIGS. 3 and 4 show one example of the content displayed by means of the display device 7. In FIG. 3, a window W1 is used to edit the automatic performance data obtained by the musical score recognition process as described above. Notes which are erroneously recognized and are different from the original notes can be corrected in the displayed score. A menu M is used to execute a variety of commandable functions by manipulating the mouse 6 on the window W1. The manipulation position of the mouse 6 is indicated by a cursor C. The indicated position of the cursor C changes in accordance with the movement of the mouse 6. The cursor C may be moved over to the menu M. Clicking the switch of the mouse 6 with the cursor C placed on one of the words displayed in the window W1, such as, File, Edit and Windows in the menu, displays a list containing a plurality of available function commands relating to the selected word. One of the function commands is selected from the displayed list, and the switch of the mouse 6 is clicked with the cursor placed at the selected function command to execute a function corresponding to the selected function command.

Function switches SW are provided below the menu M. The cursor C may be moved over to the function switches SW, and the switch of the mouse 6 is clicked with the cursor C positioned on one of the function switches to execute a function associated with the selected function switch. For example, a play switch SW1 commands the start of the automatic performance. By a click of the switch on the mouse 6 with the cursor C positioned at the switch SW1, the automatic performance is started. A stop switch SW2 commands the stop of the automatic performance. By a click of the mouse 6 at the switch SW2, the automatic performance is stopped.

The cursor C may also be moved over to a position in the score being displayed, and the switch of the mouse 6 is then clicked with the cursor at this position to display a pop-up menu concerning musical notes. The pop-up menu allows the user to edit the score, such as correction, addition and deletion of notes. By editing the musical score being displayed, the automatic performance data can be corrected. When a correction has been made, the automatic performance can be heard by clicking the switch SW1, as described above.

In accordance with an embodiment of the present invention, when the recognized musical score includes a plurality of performance parts, the plurality of performance parts may also be played simultaneously. The plurality of performance parts may be played while only the edit window W1 is displayed. However, it is easier to see the overall performance of the plurality of parts when an entire score viewing window W2 is displayed. Although a detailed description for the entire score viewing window W2 is omitted, in a preferred embodiment, the entire score viewing window W2 is opened by executing an open command switch that may be located in a predetermined function list in the menu M. The entire score viewing window W2 displays the entire score that has been inputted. In the illustrated embodiment, a score consisting of four parts, part 1 (P1) to part 4 (P4), is displayed. The entire score viewing window W2 displays a frame F representing an area of the score displayed in the edit window W1 and a location pointer L that indicates the location of the current progression of the automatic performance. By means of the frame F and the location pointer L, the score being performed and the location of the current performance progression in the automatic performance can be monitored confirmed. The location pointer L moves as the automatic performance progresses.

The cursor C may be moved to a location in the score of a desired part that is displayed in the entire score viewing window W2, and then the switch of the mouse 6 is clicked with the cursor C being positioned at this location to set the part into the non-performance state. In the illustrated embodiment, the non-performance state is displayed in a manner as shown in FIG. 4. The illustrated embodiment shows an occasion in which the mouse is clicked with the cursor C being located over the part 3 (P3). The position of the score representing the part 3 is covered with a hatching to indicate that the part 3 is in the non-performance state. In alternative embodiments, the non-performance state may be indicated by other appropriate methods. For example, the score may be covered by a hatching that still thinly shows the score through the hatching, or the color of the score may be changed without using a hatching.

Figure 5:
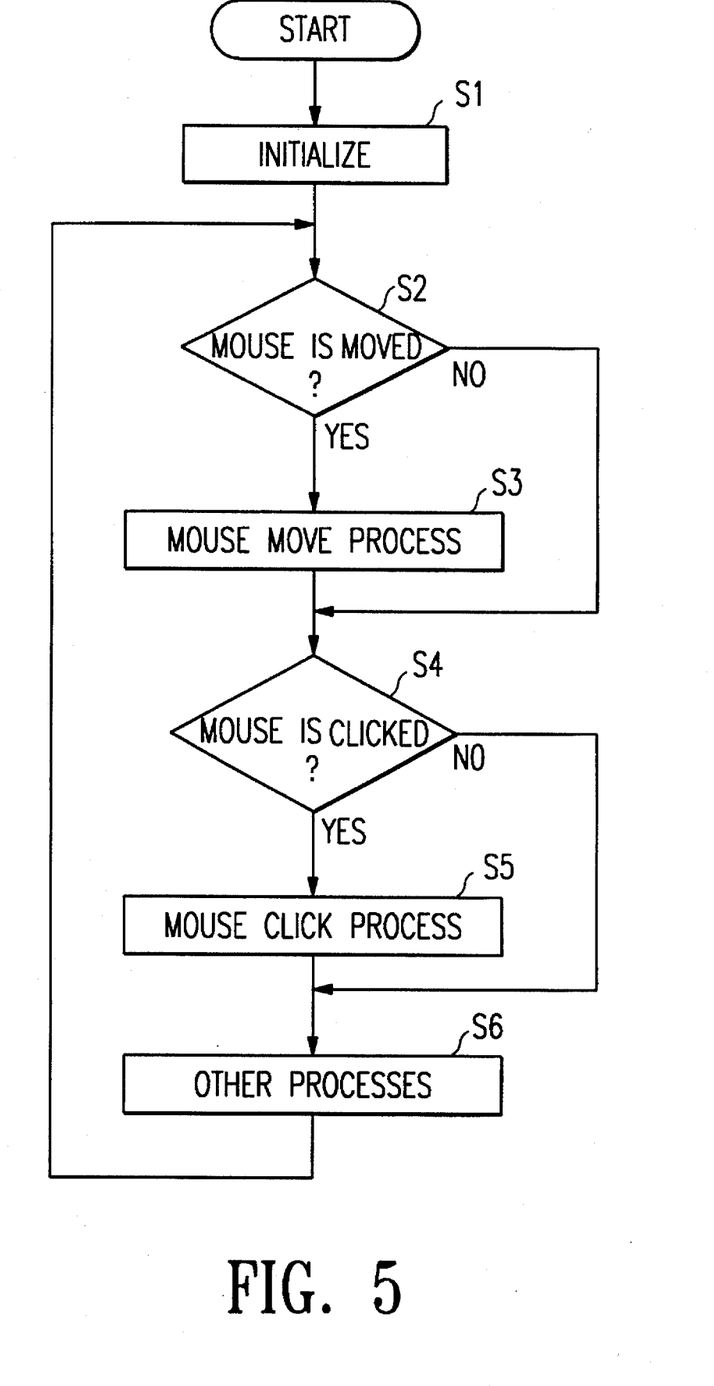
FIG. 5 is a flow chart of a main routine process in accordance with an embodiment of the present invention.

When the switch of the mouse 6 is clicked with the cursor C positioned over the hatching of the part that is in the non-performance state, the part is set back to the performance state. The display is set back to the original state that displays the score for that part. After placing a part in the non-performance state, the mouse 6 may be clicked on another part to also set that part into the non-performance state. Namely, each part may be brought into the performance state or the non-performance state independently of other parts. Also, all of the parts can be switched into the non-performance state together. In this manner, the switch of the mouse 6 is clicked with the cursor C being located on the parts displayed in the entire score viewing window W2 to bring them into the non-performance state or the performance state. The parts in the non-performance state are displayed differently from the parts in the performance state. As a result, the performance contents of the parts in the non-performance state are readily recognized. The non-performance state of a score is preferably displayed by a hatching that still thinly shows the score through the hatching or by a different color so that the performance content of the part in the non-performance state can be readily recognized A process by the CPU 1, in accordance with an embodiment of the present invention, is described with reference to the flow charts shown in FIGS. 5–7. FIG. 5 shows a main routine. First, an initialization process, such as clearing the RAM 4, is carried out in step S1. Then the process proceeds to step S2 where a determination is made as to whether the mouse 6 has been moved. If the mouse has been moved, a process concerning the operation of the mouse, such as, moving the displayed cursor C, or the like in step S3 is executed. If the determination is made in step S2 that the mouse has not been moved, the process advances to step S4 where a determination is made as to whether the switch of the mouse 6 has been clicked. If the switch of the mouse 6 has been clicked, the process proceeds to step S5 where a mouse click process is executed. Thereafter, in step S6, other processes are executed. If the determination is made in step S4 that there has not been a click of the switch of the mouse 6, the process proceeds to step S6 where other processes are executed. For example, the other processes include a process for transmission and reception of MIDI data through the MIDI interface 10. When step S6 is completed, the process returns to step S2 so that the process described above is repeated.

Figure 6:
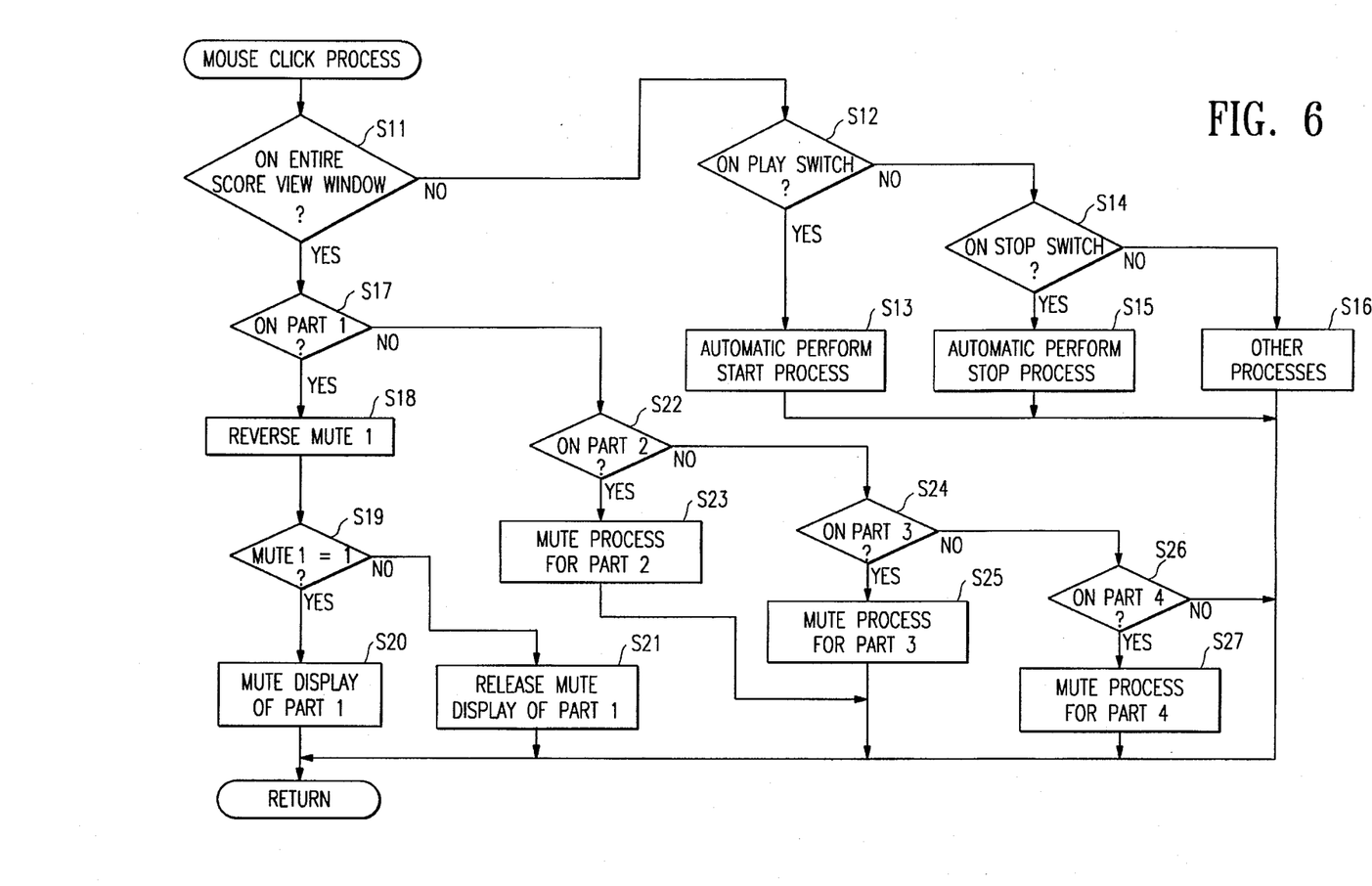
FIG. 6 is a flow chart of a mouse click process in accordance with an embodiment of the present invention.

The mouse click process in step S5 will be described with reference to FIG. 6. A determination is made in step S11 as to whether the switch on the mouse 6 is clicked with the cursor C being located in the entire score viewing window W2. When the determination is "Yes" the process proceeds to step S17. When the determination is "No", the process proceeds to step S12. More particularly, when the switch of the mouse 6 is clicked with the cursor C being located outside of the entire score viewing window W2, the determination in step 11 is "No" and the process proceeds to step S12. In step S12, a determination is made as to whether the mouse 6 is clicked with the cursor C being positioned on the display switch SW1. If the determination in step S12 is "Yes" a process of starting the automatic performance is executed in step S13. The process of starting the automatic performance is well known, and thus the description for such a process is omitted. On the other hand, when the determination in step S12 is "No" the process advances to step S14, where a determination is made as to whether the mouse 6 is clicked with the cursor C being positioned on the stop switch SW2. If the determination is "Yes", the process proceeds to step S15 where a process of stopping the automatic performance is executed. The process of stopping the automatic performance is also well known, and therefore the description for such a process is omitted.

When the determination is "No" in step 14, the mouse 6 has been clicked at other switches, on the menu M or on the displayed score in the edit window W1, and thus the process proceeds to step S16. In step S16, other processes, corresponding to the location of the cursor C at which the mouse 6 is clicked, is executed to complete the mouse click process. The mouse click process is completed in a similar manner after step S13 and step S15.

If the mouse 6 has been clicked with the cursor C being positioned on the entire score viewing window W2, the determination in step S11 is "Yes". Therefore, the process advances to step S17 where a determination is made as to whether the mouse 6 has been clicked at a location on the score representing part 1. If "Yes", the process proceeds to step S18 to switch part 1 between the performance state and the non-performance state, in which a flag MUTE 1 representing either the performance state or the non-performance state of part 1 is reversed. When the flag MUTE 1 has a value of 1, the process proceeds to step S20 where part 1 is muted (e.g., shown covered with the hatching in the illustrated embodiment in FIG. 4), and then the process returns to the main routine. When the determination in step S19 is "No" the process proceeds to step S21 where the display indicating the muted part 1 is released (and the hatching is removed), and the process returns to the main routine. In this manner, when the switch of the mouse 6 is clicked with the cursor C being located on part 1, part 1 is switched alternatively between the performance state and the non-performance state. When the non-performance state is selected, the score of part 1 is covered by the hatching to indicate the non-performance state.

When the determination in step S17 is "No", a determination is made in step S22 as to whether the mouse 6 is clicked on part 2. If "Yes", part 2 is muted in step S23 (in the same manner as the above described steps S18 through step S21 for the part 1). When the switch of the mouse 6 is clicked with the cursor C being positioned on the score over part 3 and on the score over part 4, the process proceeds to steps S24 and S25 and steps S26 and S27, respectively, where part 3 and part 4 are muted, respectively.

Figure 7:
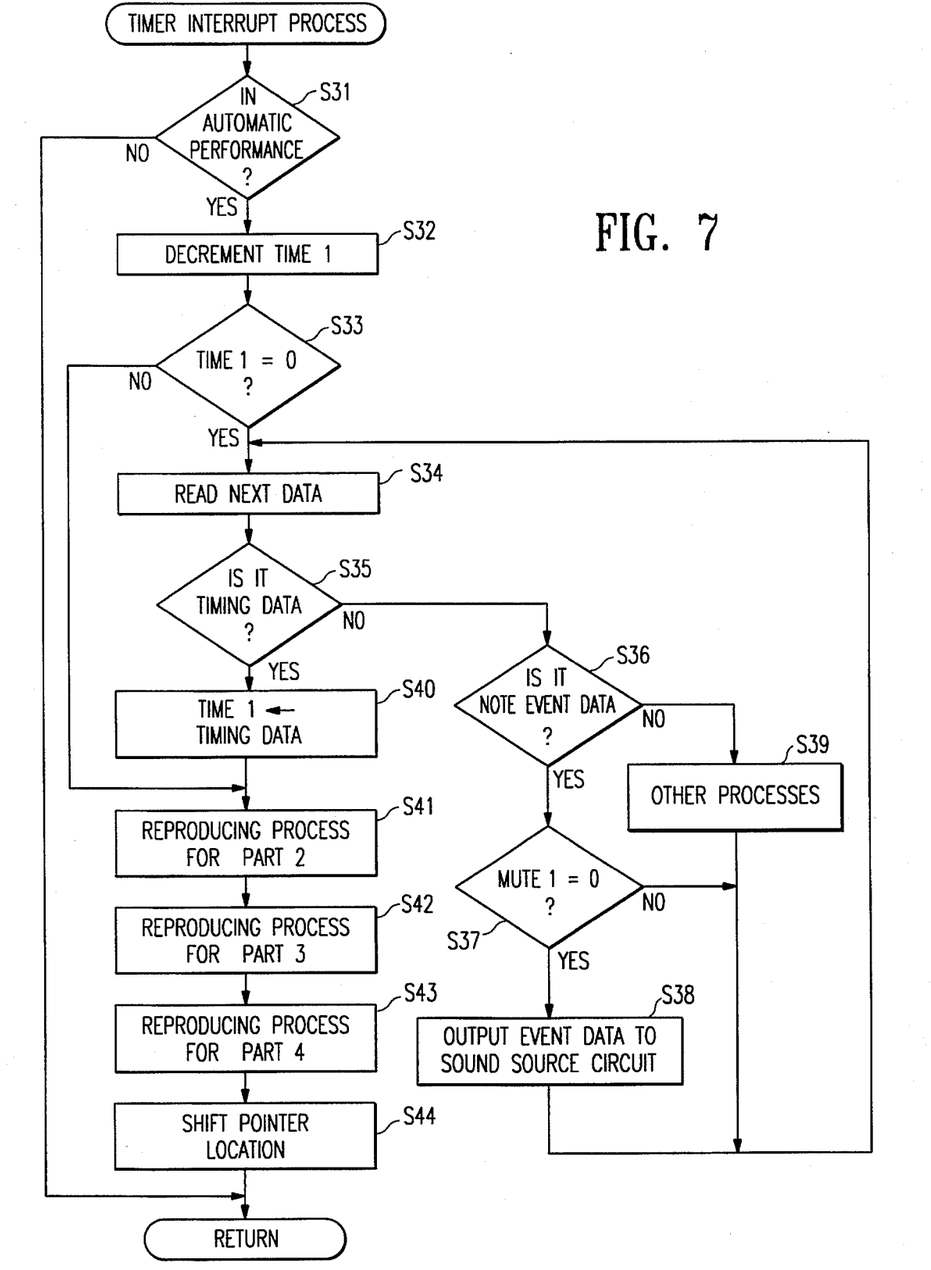
FIG. 7 is a flow chart of a timer interrupt process in accordance with an embodiment of the present invention.

Referring to FIG. 7, a timer interrupt process is described below. The timer interrupt process is executed by interrupting the main routine each time the timer 9 generates an interrupt signal for the CPU 1. For example, an interrupt cycle may be defined by a time duration equal to a three hundred eighty fourth note, as described above, and is variable depending upon a specified tempo.

First, a determination is made in step S31 as to whether the automatic performance is currently progressing. When the timer interrupt process is executed after the process of starting the automatic performance is executed in step S13, the determination is "Yes". When the timer interrupt process is executed before the process of starting the automatic performance is executed in step S13, or after the automatic performance has been started but the process of stopping the automatic performance is executed, the determination is "No". When the determination is "No" the timer interrupt process is immediately finished.

If the determination in step S31 is "Yes", the value of register TIME 1 is decremented in step S32. The timing data described above (see FIG. 2) is set in the register TIME 1, and the value of the timing data is decremented each time the timer interrupt process is executed. The register TIME 1 controls the timing of the generation of event data in part 1. An initial value of the register TIME 1 is set in the automatic performance starting process in step S13.

After step S32 is completed, a determination is made in step S33 as to whether the value of the register TIME 1 is zero (0). If "Yes" the time indicated by the timing data has elapsed, and the process has reached a timing at which the event data should be generated. Therefore, the next data, namely, data stored at an address next to the timing data is read out in step S34. A determination is made in step S35 as to whether the read out date is timing data. The determination is "No" because event data is stored next to the timing data in the illustrated embodiment.

Then the process proceeds to step S36, where a determination is made as to whether the read out data is event data. If "Yes", a determination is made in step S37 as to whether the abovementioned flag MUTE 1 has the value of "1" or "0". In other words, a determination is made as to whether part 1 is in the performance state. If "Yes", the data read out in step S38 is outputted through the MIDI interface 10 to an external sound source apparatus. If the determination in step S37 is "No", part 1 is in the non-performance state, and the read out data is not outputted to the external sound source apparatus. Thereafter, the process returns to step S34.

If the determination in step S36 is "No" the read out data is neither timing data nor event data. In this case, the process proceeds to step S39, where a process representative of the read out data is executed. For example, if the read out data is data for changing the loudness, the loudness change data is outputted to the sound source circuit 8. If the read out data is data for the management of bars, a process for managing the bars is executed. Thereafter, the process returns to step S34.

In step S34, data at the next address is read out as described above. This time, the data is the one stored next to event data, and there is a possibility that the read out data is timing data. If the read out data is timing data, the determination in step S35 is "Yes" and the process proceeds to step S40. In step S40, the read out timing data is stored in the register TIME 1, for the preparation of reading out the next event data.

Processes of reading out parts 2, 3 and 4 are executed in a similar manner as the process executed for part 1 (in step S41, step S42 and step S43), then the displayed location pointer L is moved in the direction of the performance progression, and the timer interrupt process is completed. In the manner described above, performance data for parts 1 through 4 are read out. If the flag MUTE 1 for any one of the parts has the value "1", note event data for that part is not outputted to the sound source circuit since that part is in the non-performance state.

In the illustrated embodiment, an automatic performance apparatus has a sound source circuit. However, the sound source circuit may be provided independently of the apparatus. Alternatively, an automatic performance apparatus in accordance with an embodiment of the present invention may be composed of a personal computer and an application software.

Furthermore, in the illustrated embodiment, a mouse is used to designate a part to be placed in the non-performance state or in the performance state. However, other devices, such as, for example, a track ball may be used to designate a part. Alternatively, a touch panel may be provided at the display device so that a user directly touches the displayed score to execute various commands.

Still further, in the illustrated embodiment, the read out performance data for a part is not outputted to the sound source circuit when the part is in the non-performance state. However, commands may be provided to the sound source circuit so that the loudness is reduced to "0" or substantially "0".

Moreover, an automatic performance data is formed by reading a score image by a scanner and by processing the score image by a score recognition process. However, other methods may be used to form the automatic performance data. For example, the performance data may be formed, using the conventional key board. Alternatively, the performance data may be formed by the use of switches to designate the tone pitch and tone length.

Still further, a separate memory device (not shown), or an additional work area in the RAM 4 may be provided for storing data that is different from the performance data. For example, the separate memory device stores image data that is used for displaying bit map images on the display device 7. In a preferred embodiment, a score image representing the performance data and another image representing the data stored in the separate memory device may be simultaneously displayed on the display device 7. Alternatively, only an image representing the data stored in the separate memroy device may be displayed while the score image based on the performance data is not displayed.

The illustrated embodiment has been shown with four parts. However, in alternative embodiments, more or less parts may be used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An automatic performing apparatus comprising:

a first memory device that stores automatic performance data for a plurality of parts;

a performing device that reads and performs the automatic performance data;

a display device that displays a score for the plurality of parts;

a designating device that designates one of the plurality of parts in the score displayed on the display device;

a performance controlling device, responsive to the designating device, that controls the performing device to set the designated one of the plurality of parts to a non-performance state if the designated one of the plurality of parts was in a performance state; and a display controlling device, responsive to the designating device, that controls the display device to display the designated one of the plurality of parts to represent the non-performance state if the designated one of the plurality of parts was in the performance state.

2. An automatic performing apparatus according to claim 1, wherein, when the designating device designates one of the plurality of parts which is in the non-performance state, the performance controlling device controls the performing device so that the designated one of the plurality of parts in the non-performance state is set to represent the performance state, and the display controlling device controls the display device to change a display of the designated one of the plurality of parts in the non-performance state to the performance state.

3. An automatic performing apparatus according to claim 1, wherein the display control device provides a hatching over the designated one of the plurality of parts in the score displayed on the display device to represent the non-performance state.

4. An automatic performing apparatus according to claim 1, wherein the display control device changes the color of the designated one of the plurality of parts in the score displayed on the display device to represent the non-performance state.

5. An automatic performing apparatus according to claim 1, further including a second memory device that stores data different from the automatic performance data stored in the first memory device, wherein the display device displays an image representing the data stored in the second memory device.

6. An automatic performing apparatus comprising:

a first memory device that stores automatic performance data for a plurality of parts;

a performing device that reads and performs the automatic performance data;

a display device that displays a score for the plurality of parts;

a cursor display device that displays a cursor on the score;

a cursor moving device that moves the cursor displayed on the display device;

a designating switch device, coupled to the cursor moving device, that designates one of the plurality of parts in the score displayed on the display device;

a position detection device that detects a location of the cursor when the designating switch device is manipulated;

a determination device that determines the location of the cursor detected by the position detection device on the plurality of parts in the score displayed on the display device;

a performance controlling device that controls the performing device so that the designated one of the plurality of parts, designated by the designating switch device, is set to represent a non-performance state when the determination device determines that the designating switch device is manipulated while the cursor is on the designated one of the plurality of parts in the score displayed on the display device; and a display control device that controls the display device to display that the designated one of the plurality of parts is in the non-performance state when the determination device determines that the designating switch device is manipulated while the cursor is on the designated one of the plurality of parts in the score displayed on the display device.

7. An automatic performing apparatus according to claim 6, wherein, when the determination device determines that the designating switch device is manipulated while the cursor is on the designated one of the plurality of parts in the score displayed on the display device, and when the designated one of the plurality of parts is in the non-performance state, the performance controlling device controls the performing device so that the designated one of the plurality of parts is set to represent a performance state, and the display control device controls the display device to display the designated one of the plurality of parts in the performance state.

8. An automatic performing apparatus according to claim 6, wherein the display control device provides a hatching over the designated one of the plurality of parts in the score displayed on the display device to represent the non-performance state.

9. An automatic performing apparatus according to claim 6, wherein the display control device changes the color of the designated one of the plurality of parts in the score displayed on the display device to represent the non-performance state.

10. A method of executing automatic performance data, the method comprising the steps of:

storing the automatic performance data for a plurality of parts in a memory device;

reading and performing the automatic performance data;

displaying a score of the plurality of parts representing the automatic performance data;

designating one of the plurality of parts in the score;

setting the designated one of the plurality of parts to represent a non-performance state if the designated one of the plurality of parts was in a performance state; and displaying the designated one of the plurality of parts in the non-performance state if the designated one of the plurality of parts was in the performance state.

11. A method of executing automatic performance data according to claim 10, further including the steps of setting the designated one of the plurality of parts in the non-performance state to represent the performance state and displaying the designated one of the plurality of parts which is now in the performance state.

12. A method of executing automatic performance data according to claim 10, further including the step of providing a hatching over the designated one of the plurality of parts in the score displayed to represent the non-performance state.

13. A method of executing automatic performance data according to claim 10, further including the step of changing the color of the designated one of the plurality of parts in the score displayed to represent the non-performance state.

14. An automatic performing apparatus comprising:

a memory device that stores automatic performance data for a plurality of parts;

a performing device that reads and performs the automatic performance data;

a display device that displays a score for at least two of the plurality of parts;

a designating device that designates one of the plurality of parts in the score displayed on the display device;

a controlling device, responsive to the designating device, that controls the performing device to set the designated one of the plurality of parts from a current state to either a non-performance state or a performance state depending upon the current state, and controls the display device to display the designated one of the plurality of parts in either the non-performance state or the performance state depending upon the current state.

15. An automatic performing apparatus according to claim 14, wherein, when the designating device designates one of the plurality of parts in the non-performance state, the controlling device controls the performing device so that the designated one of the plurality of parts in the non-performance state is set to represent the performance state, and the display controlling device controls the display device to change a display of the designated one of the plurality of parts in the non-performance state to the performance state.

* * * * *